United States Patent [19]

Luna

[11] 4,090,438
[45] May 23, 1978

[54] FRYING UTENSIL

[76] Inventor: Miguel L. Luna, 3580 Mack Rd., Bridgeport, Mich. 48722

[21] Appl. No.: 668,464

[22] Filed: Mar. 19, 1976

[51] Int. Cl.² .......................... A47J 43/18; A23P 1/00
[52] U.S. Cl. .......................................... 99/441; 99/384
[58] Field of Search .......... 99/426, 411, 413, 415–418, 99/427, 439, 441, 383, 384; 249/92

[56] References Cited

U.S. PATENT DOCUMENTS

| D. 236,414 | 8/1975 | Kroll | 99/413 X |
|---|---|---|---|
| 1,689,395 | 10/1928 | Kourim | 99/441 UX |
| 2,719,480 | 10/1955 | Prickett et al. | 99/426 |
| 2,838,990 | 6/1958 | Stiburski | 99/441 X |
| 2,966,841 | 1/1961 | Jigamian | 99/441 |
| 3,308,748 | 3/1967 | Jalbert | 99/426 X |
| 3,433,151 | 3/1969 | Farran et al. | 99/426 X |
| 3,511,172 | 5/1970 | Jones | 99/426 |

Primary Examiner—Harvey C. Hornsby
Assistant Examiner—Timothy F. Simone
Attorney, Agent, or Firm—Learman & McCulloch

[57] ABSTRACT

A frying utensil especially adapted for frying rolled tacos comprises a rack composed of wire members shaped to form a plurality of open top receptacles for the accommodation of tacos, the rack being provided with a clamp which may be swung to and from a position in which it overlies the open tops of the receptacles. A wire retainer is secured to one side of the rack and projects transversely from the latter so as to avoid inadvertent escape of the tacos from the rack when the latter is moved to a position to drain the tacos.

4 Claims, 3 Drawing Figures

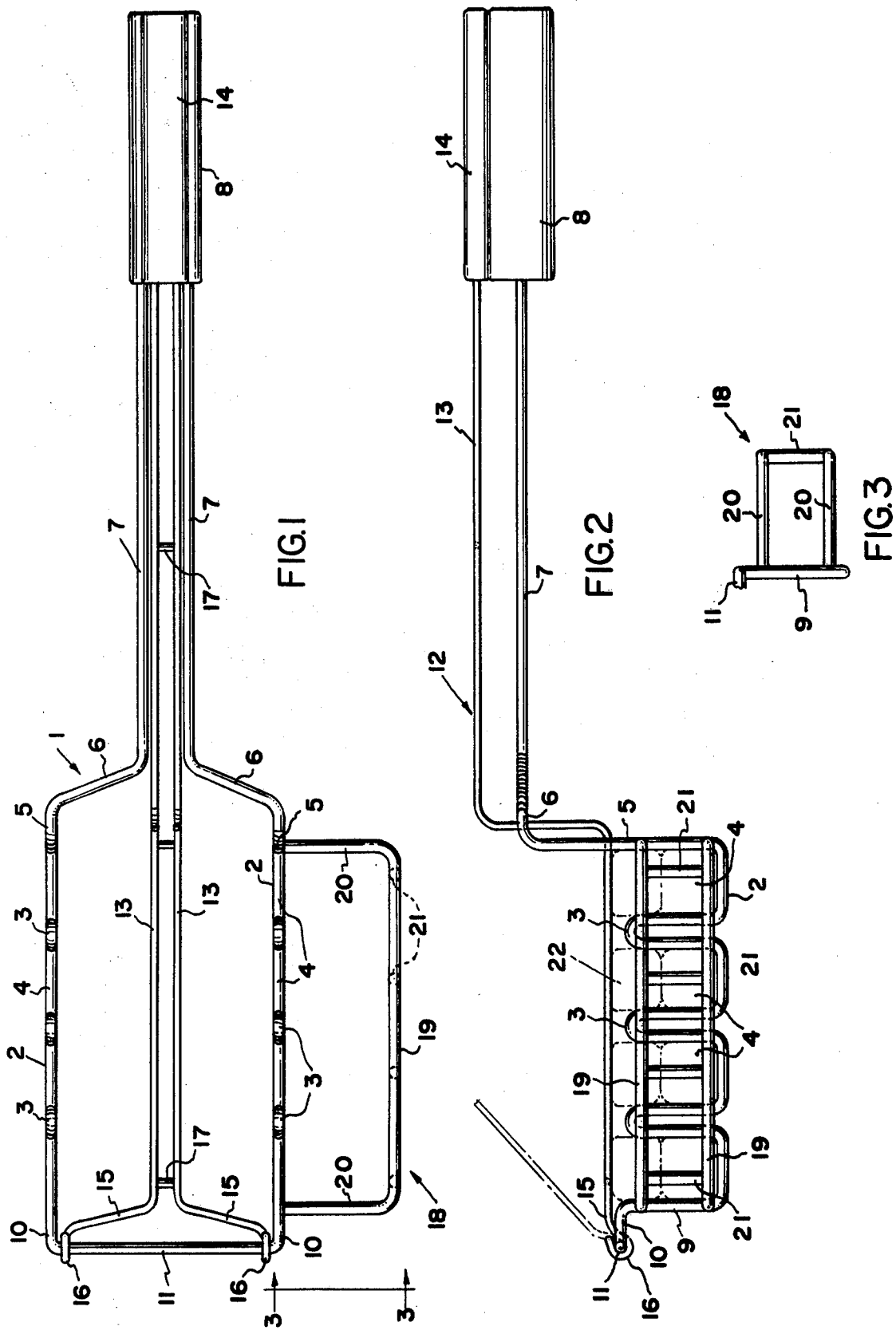

FRYING UTENSIL

The invention herein disclosed relates to a utensil for deep frying rolled tacos. Such tacos conventionally are immersed in hot oil for a short period of time, following which they are removed from the oil and permitted to drain. Drainage is facilitated if the tacos are supported with their longitudinal axes vertical. Various receptacles have been proposed heretofore for use in frying tacos of the kind referred to, but not all of them have been altogether satisfactory.

Most of the known frying utensils include an open wire frame in which uncooked tacos may be received and held therein by a retaining clamp. Although the tacos may be retained snugly in the utensil prior to their being cooked, shrinkage during cooking often results in looseness between the tacos and the utensil. As a consequence, rotating of the utensil to facilitate drainage of the tacos often results in the escape of one or more tacos from the utensil.

A utensil constructed in accordance with the invention has for its principal objective the provision of an auxiliary retaining structure which will provide for positive retention of tacos in the utensil until the tacos are deliberately removed therefrom and without subjecting the tacos to clamping forces which may crush them.

Other objects and advantages of the invention will be pointed out specifically or will become apparent from the following description when it is considered in conjunction with the appended claims and the accompanying drawings, in which:

FIG. 1 is a top plan view of a utensil constructed in accordance with the invention;

FIG. 2 is a side elevational view; and

FIG. 3 is an end elevational view of a detail of the construction as viewed in the direction of the arrows 3—3 of FIG. 1.

A utensil constructed in accordance with the invention comprises a base frame or rack 1 having a pair of parallel, spaced apart stringers 2 that are bent at intervals to form upstanding legs 3 which provide a plurality of open top and open end receptacles 4. Corresponding ends of the stringers 2 are bent upwardly to form support members 5 that also define one end of the adjacent receptacle 4. At the upper ends of the supports 5, the stringers are bent horizontally and toward one another as at 6 and then are bent to form parallel runs 7 which terminate in a handle 8.

The opposite ends of the stringers 2 are bent upwardly to parallel the supports 5 and form end members 9 for the adjacent receptacle 4. At the upper ends of the end members 9, the stringers are bent horizontally to form projections 10, and the projections 10 are joined by a horizontal leg 11.

A clamp member 12 provides a movable closure for the compartments 4. The clamp member 12 comprises a pair of parallel wires 13 corresponding ends of which are fixed to a handle 14. The opposite ends of the wires 13 are bent to form outwardly flaring legs 15 the terminal ends of which are bent to form loops 16 which hingedly embrace the leg 11 so as to enable the clamp member 12 to be swung about an axis provided by the leg 11. The parallel wires 13 may be reinforced by short cross bars 17 which are joined to the wires at spaced intervals. The clamp member 12, when in the clamping position shown in FIG. 2, occupies a position at or slightly above the level of the upper ends of the receptacles 4 so as to avoid imposing a crushing force on tacos in the receptacles.

A generally U-shaped retaining cage structure 18 is provided along at least one side of the base member 1 and comprises a pair of spaced apart, parallel filamentary wires 19 having their opposite ends bent to form legs 20 that are welded or otherwise suitably fixed to the members 5 and 9. The wires 19 thus form webs which are spaced from the adjacent side of the rack 1. The webs preferably are joined to one another at intervals by cross bars 21 so as not only to reinforce the cage, but also to form an obstruction or barrier opposite the open end of each receptacle 4.

To condition the apparatus for use, the clamp member 12 may be swung upwardly from the position shown in FIG. 2, as indicated by the dotted lines, so as to permit the base member 1 to be filled with a plurality of rolled tacos 22. As shown in FIG. 2, eight tacos 22 are supported by the utensil, there being two tacos in each of the receptacles 4. Thereafter, the clamp 12 may be returned to the position shown in FIG. 2 and the tacos immersed in hot oil. When the tacos have been cooked, the utensil may be removed from the oil and rocked to the position shown in FIG. 1, in which position the longitudinal axes of the tacos are vertical and the cage 18 is lowermost, thereby facilitating drainage of excess oil from the cooked tacos. In this position of the utensil, the cage will provide a positive restraint on the tacos to prevent their inadvertent escape from their respective receptacles 4.

The disclosed embodiment is representative of a presently preferred form of the invention, but is intended to be illustrative rather than definitive thereof. The invention is defined in the claims.

I claim:

1. A frying utensil comprising a rack formed of a number of substantially parallel, side-by-side, spaced apart members shaped at corresponding intervals to provide a plurality of open top and open end receptacles; clamp means; means hinging one end of said clamp means to said rack to enable said clamp means to be swung into and out of overlying relation with said rack; and a U-shaped retainer structure comprising a plurality of parallel, coplanar filamentary webs, each of which terminates at its opposite ends in parallel legs spaced apart by said webs, said legs of each of said webs being joined to one of said members at one side of said rack, each of said webs extending the length of said rack but being spaced by its legs from one end of each of said receptacles, whereby said webs form a barrier at said one end of each of said receptacles when said utensil is tilted to a position in which said webs are lowermost.

2. A utensil according to claim 1 including reinforcing members joined to and extending between said pair of webs.

3. A utensil according to claim 1 wherein said clamp means, when in overlying relation with said rack, occupies a position substantially at the top of each of said receptacles.

4. A utensil according to claim 1 including a first handle joined to and extending from one end of said rack and a second handle joined to said clamp means and swingable with the latter to a position parallel to and overlying said first handle.

* * * * *